US006895919B1

(12) United States Patent
Taxon

(10) Patent No.: US 6,895,919 B1
(45) Date of Patent: May 24, 2005

(54) EVEN-FIRING, FULLY BALANCED, V-TWIN ENGINE

(75) Inventor: Morse N Taxon, Oak Park, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 10/758,549

(22) Filed: Jan. 15, 2004

(51) Int. Cl.[7] ................................. F02B 75/06
(52) U.S. Cl. .................... 123/192.2; 123/54.4
(58) Field of Search .............. 123/192.2, 54.4

(56) References Cited

U.S. PATENT DOCUMENTS 6,729,289 B1 * 5/2004 Laimbock et al. ....... 123/192.2

* cited by examiner

Primary Examiner—Noah P. Kamen
(74) Attorney, Agent, or Firm—Ralph E. Smith

(57) ABSTRACT

A V-twin engine includes a two cylinder reciprocating apparatus, having a pair of connecting rods joined to a crankshaft through a pair of connecting rod journals that are centered at a common throw radius from the crankshaft axis, and angularly displaced from one another along the throw radius by an angular displacement equal to an included angle defined by axes of the cylinders, so that the pistons will move in unison and each reach top dead center (TDC) and bottom dead center (BDC) in their respective cylinders at substantially the same time. The cylinders fire alternately on sequential rotations the crankshaft. Counterweights on two balance shafts rotate in a 1:1 rotation ratio in a direction opposite to the crankshaft, with forces from the balance shaft counterweights and a crankshaft counterweight alternately aligning and opposing for counterbalancing vertical forces and unbalance loads in the engine.

13 Claims, 4 Drawing Sheets

EVEN-FIRING, FULLY BALANCED, V-TWIN ENGINE

TECHNICAL FIELD OF THE INVENTION

This invention relates to twin cylinder reciprocating devices, and more particularly to a two-cylinder reciprocating engine having the cylinders disposed configured in a V-twin arrangement.

BACKGROUND OF THE INVENTION

In multi-cylinder reciprocating piston devices, such as compressors and engines, it is often desirable to arrange the cylinders in a V relationship, with respect to one another, to provide a device that is more compact than the device would be if the cylinders were arranged in a straight row, or diametrically opposed to one another. As the pistons reciprocate, in any reciprocating piston device, the motion of the pistons in the cylinders, together with the motions and rotations of other parts of the device, such as a crankshaft and connecting rods joining the pistons to the crankshaft, generate unbalance loads that must be counterbalanced for smooth and quiet operation of the device. Arranging the cylinders in a V relationship, can, in some instances, introduce unbalance loads during operation of the engine, which are unique to the number of cylinders and the included angle between the cylinders. Certain combinations of cylinder numbers and included angles are more readily balanced than other combinations, and as a general rule, the more cylinders that the device has, the easier it will be to achieve an acceptably low level of vibration and noise.

In a V-twin reciprocating device, having only two cylinders arranged in a V relationship to one another, the motion of the components creates an inherent unbalance load that has traditionally been difficult to counterbalance, except at certain specific angular relationships between the cylinders, such as 60 or 90 degrees, with both pistons attached to a common journal of the crankshaft. If it is desired to utilize another angular relationship, some form of internal balancing must be provided.

If the V-twin reciprocating apparatus is an engine, there is an additional problem to be addressed. A 90° V-twin engine with a single crank pin for both connecting rods can be balanced, but fires at uneven alternate intervals of 270 and 450 degrees of crankshaft rotation. Similarly, a 60° V-twin engine with a common pin could also be balanced, but would fire at uneven alternate intervals of 300 and 420 degrees of crankshaft rotation. Having the cylinders fire at an uneven interval generates vibration and noise that is objectionable in environments such as an automobile. It is desirable that a V-twin engine fire at even intervals of 360°, to produce a more acceptable vibration and sound profile for an automotive environment.

What is needed is an improved V-twin reciprocating apparatus, and an improved method for operating a V-twin reciprocating device, that facilitate smooth and quiet operation of the V-twin reciprocating apparatus.

SUMMARY OF THE INVENTION

The invention provides an improved V-twin reciprocating apparatus and an improved method for operating a V-twin reciprocating apparatus, by joining a pair of connecting rods to a crankshaft, through a pair of connecting rod journals that are centered at a common throw radius from the crankshaft axis, and displaced from one another along the throw radius by an angular displacement equal to an included angle defined by axes of the cylinders, so that the pistons will reciprocate in unison, and each reach top dead center (TDC) and bottom dead center (BDC) in their respective cylinders at substantially the same time. A crankshaft counterweight and one or more balance shafts may also be provided for counterbalancing unbalance loads in the apparatus.

In one form of the invention, a V-twin reciprocating apparatus, having a crankshaft mounted in a crankcase for rotation about a crankshaft axis, includes a pair of cylinders, a pair of pistons, and a pair of connecting rods. Each cylinder, of the pair of cylinders, defines a cylinder axis orthogonally disposed with respect to the crankshaft axis. The cylinders are disposed in a V configuration with respect to one another, with the cylinder axes defining an included angle with respect to one another bisected by a central plane including the crankshaft axis. The pair of pistons are disposed, one in each cylinder, for reciprocating movement in the cylinders along the cylinder axes from a top dead center (TDC) position to a bottom dead center (BDC) position in the cylinders. The pair of connecting rods, one in each cylinder, operatively connect the pistons to the crankshaft in such a manner that the pistons will reach TDC and BDC in their respective cylinders at substantially the same time. The connecting rods are joined, at a crankshaft end thereof, to the crankshaft by a pair of connecting rod journals centered at a common throw radius from the crankshaft axis and angularly displaced from one another along the throw radius by an angular displacement equal to the included angle of the cylinder axes.

The invention may take the form of a V-twin engine. Ignition in the V-twin engine may be controlled in such a manner that the cylinders fire alternately on sequential rotations of the crankshaft when the piston in the firing cylinder is approximately at TDC, to thereby provide an even firing engine that fires at 360 degrees of crankshaft revolution.

A V-twin reciprocating apparatus, according to the invention, may also include a crankshaft counterweight attached to the crankshaft for rotation therewith about the crankshaft axis, and a first balance shaft having a counterweight attached thereto, mounted within the crankcase for rotation about a first balance shaft axis, and operatively connected to the crankshaft to be rotated thereby about the first balance shaft axis. The first balance shaft may rotate in a direction opposite a direction of rotation of the crankshaft in a one-to-one (1:1) ratio of rotations of the second balance shaft with respect to rotations of the crankshaft. A second balance shaft may also be operatively connected to the crankshaft for rotation about a second balance shaft axis in unison with the first balance shaft in a direction opposite the direction of rotation of the crankshaft, in a one-to-one (1:1) ratio of rotations of the second balance shaft with respect to rotations of the crankshaft. The second balance shaft includes a second balance shaft counterweight attached thereto for rotation with the second balance shaft about the second balance shaft axis, in unison with the counterweight of the first balance shaft. A crankshaft counterweight sized for counterbalancing one half of the total unbalance load of the engine, may be used in combination with counterweights on the first and second balance shafts that are each sized for counterbalancing one quarter of the total unbalance load of the engine.

The invention may also take the form of a method for operating an engine in using an apparatus, as described above.

The foregoing and other features and advantages of the invention will become further apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Figure 1:
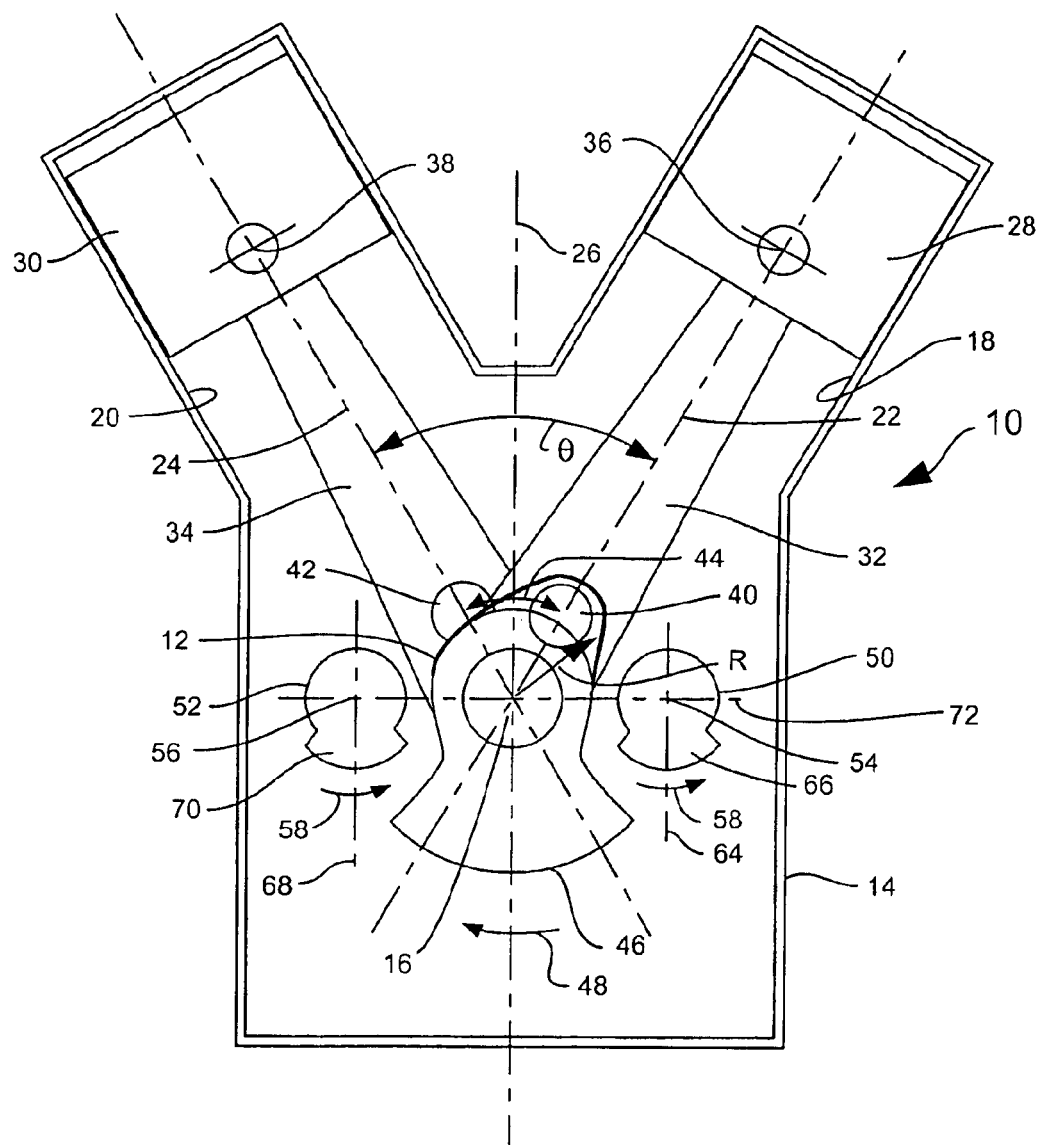
FIG. 1 is a schematic cross-section of an exemplary embodiment of V-twin reciprocating apparatus, according to the invention, in the form of a V-twin engine, shown with both pistons located top dead center (TDC)

Throughout the following description of exemplary embodiments of the invention, components and features that are substantially equivalent or similar will be identified in the drawings by the same reference numerals. For the sake of brevity, once a particular element or function of the invention has been described in relation to one exemplary embodiment, the description and function will not be repeated for elements that are substantially equivalent or similar in form and/or function to the components previously described, in those instances where the alternate exemplary embodiments will be readily understood by those skilled in the art from a comparison of the drawings showing the various exemplary embodiments in light of the description of a previously presented embodiment.

DETAILED DESCRIPTION

FIG. 1 shows an exemplary embodiment of a V-twin reciprocating apparatus, in the form of a V-twin engine 10, having a crankshaft 12 mounted in a crankcase 14 for rotation about a crankshaft axis 16.

A pair of cylinders 18, 20, each define a respective cylinder axis 22, 24, which is orthogonally disposed with respect to the crankshaft axis 16. The cylinders 18, 20 are disposed in a V configuration, with respect to one another, with the cylinder axes 22, 24 defining an included angle θ with respect to one another. The included angle θ is bisected by a central plane 26, which includes the crankshaft axis 16.

Figure 2:
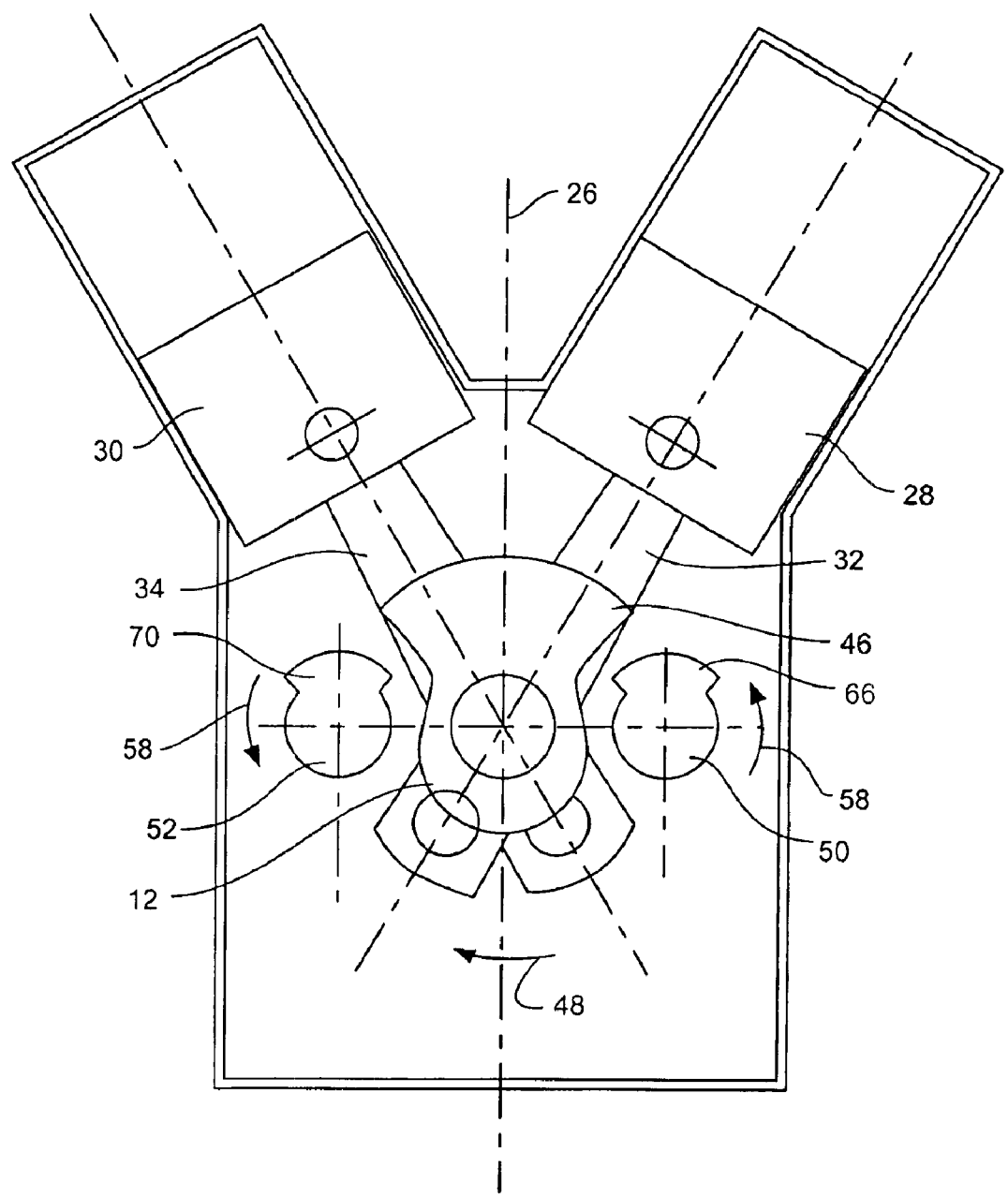
FIG. 2 is a schematic cross-section of the V-twin engine of FIG. 1, according to the invention, with both pistons located bottom dead center (BDC)

A pair of pistons 28, 30 are disposed, one in each cylinder 18, 20, for reciprocating movement in the cylinders 18, 20 along the cylinder axes 22, 24 from a top dead center (TDC) position in the cylinders 18, 20, as shown in FIG. 1, to a bottom dead center (BDC) position in the cylinders, as shown in FIG. 2.

A pair of connecting rods 32, 34, one in each cylinder 18, 20, operatively connect the pistons 28, 30 to the crankshaft 12, in such a manner that the pistons 28, 30 travel in unison and will reach TDC and BDC in their respective cylinders 18 at substantially the same time, as will be seen by examining FIGS. 1 and 2, and 4a–4d. The connecting rods 32, 34 are identical in length, and are joined to the pistons 28, 30 with conventional wrist pins 36, 38. The connecting rods 32, 34 are joined at a crankshaft end thereof to the crankshaft 16 by a pair of connecting rod journals 40, 42 centered at a common throw radius R from the crankshaft axis 16. The connecting rod journals 40, 42 are angularly displaced from one another along the throw radius by an angular displacement 44 that is equal to the length of an arc defined by the intersection of the throw radius R with the included angle θ of the cylinder axes 20, 22.

The crankshaft 12 includes a crankshaft counterweight 46. The crankshaft counterweight 46 is fixedly attached to the crankshaft 12 at a point substantially diametrically opposite, with respect to the crankshaft axis 16, from the connecting rod journals 40, 42, as shown in FIG. 1. The crankshaft counterweight 46 rotates with the crankshaft 12 about the crankshaft axis 16, to thereby substantially center the counterweight 46 along the central plane 26 at a point opposite the pistons 28, 30, when the pistons 28, 30 are at TDC, as shown in FIG. 1, and along the central plane 26 at a point adjacent the pistons 28, 30, when the pistons 28, 30 are at BDC, as shown in FIG. 2.

As shown, in FIGS. 1 and 2, the crankshaft 12 defines a direction of rotation of the crankshaft, as indicated by arrow 48. A first and a second balance shaft 50, 52 are operatively connected to the crankshaft 12 for rotation respectively about a first and a second balance shaft axis 54, 56 in a direction, as shown by arrows 58, opposite the direction of rotation 48 of the crankshaft 12.

Figure 3B:
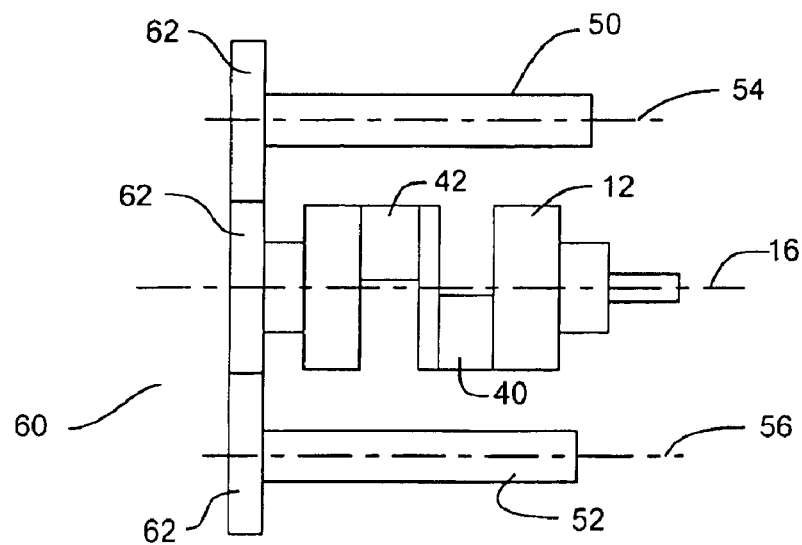
FIGS. 3a and 3b are perspective and schematic representations, respectively, of a crankshaft, and an exemplary embodiment of a gear train connecting the crankshaft to two balance shafts of the engine of FIGS. 1 and 2.
Figure 3A:
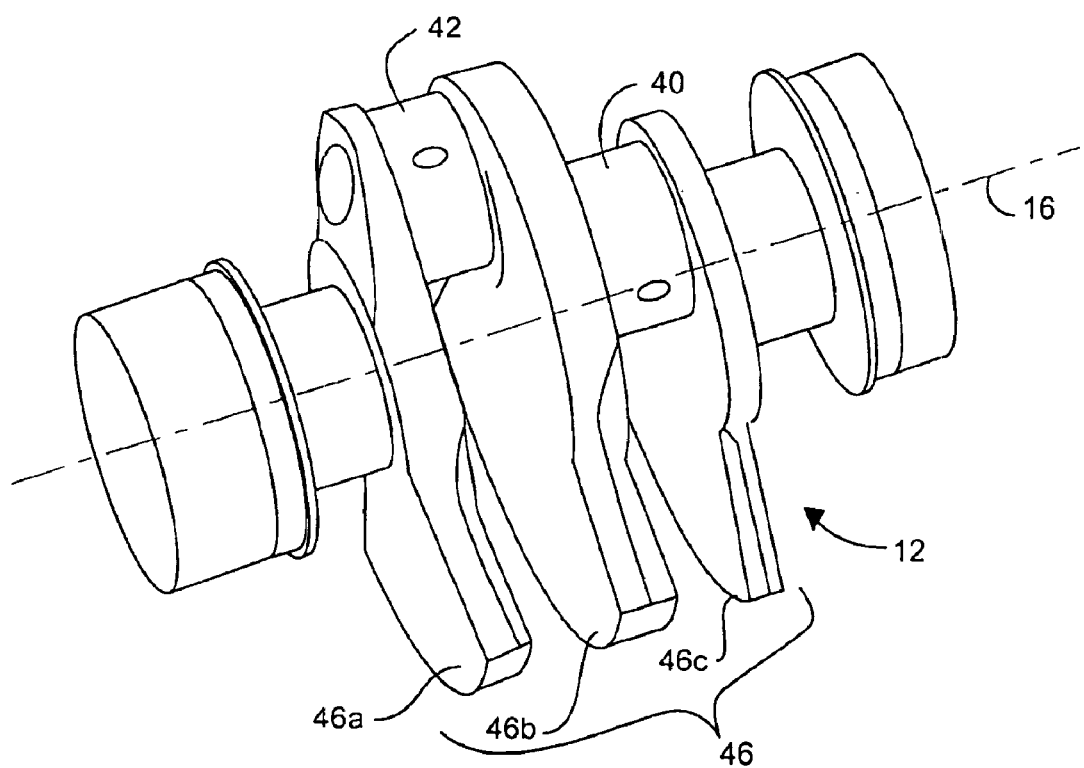

As shown in FIG. 3a, in the exemplary embodiment of the engine 10, the crankshaft counterweight 46 is split into three parts 46a, 46b, 46c positioned at either axial end and between the connecting rod journals 40, 42 of the crankshaft 12. In the cross sectional drawings of FIGS. 1, 2, and 4a–4d, the counterweight 46 is identified as a single part bearing the reference numeral 46. As shown in FIG. 3b, the first and second balance shafts 50, 52, in the exemplary embodiment of the engine 10, are operatively connected to the crankshaft 12 through a gear train 60, having three gears 62 of the same diameter, with one gear 62 attached to the crankshaft 12, and the other two gears 62 attached respectively to the first and second balance shafts 50, 52. By virtue of this drive arrangement, the first and second balance shafts 50, 52 rotate about their respective balance shaft axes 54, 56 in a one-to-one (1:1) ratio of rotations of the first and second balance shafts 50, 52 with respect to rotations of the crankshaft 12, but in a direction opposite a direction of rotation of the crankshaft 12. Those having skill in the art will recognize, however, that in other embodiments of the invention, it may be desirable to operatively connect the balance shafts 50, 52 to the crankshaft with other types of drive components or arrangements.

As shown in FIG. 1, the first balance shaft axis 54 is oriented in a direction parallel to the crankshaft axis 16 and lying in a first balance shaft plane 64 extending parallel to the central plane 26. The first balance shaft 50 further includes a first balance shaft counterweight 66 attached thereto for rotation with the first balance shaft 50 about the first balance shaft axis 54 from a first position at a point substantially opposite the cylinders 18, 20, along the first balance shaft plane 64 when the pistons 28, 30 are at TDC, as shown in FIG. 1, to a second point substantially adjacent the cylinders 18, 20 along the first balance shaft plane 64 when the pistons 28, 30 are at BDC, as shown in FIG. 2.

The second balance shaft axis 56 is oriented in a direction parallel to the crankshaft axis 16 and lying in a second balance shaft plane 68 extending parallel to the central plane 26. The second balance shaft 52 further includes a second balance shaft counterweight 70 attached thereto for rotation with the second balance shaft 52 about the second balance shaft axis 56 from a first position at a point substantially opposite the cylinders 18, 20, along the second balance shaft plane 68 when the pistons 28, 30 are at TDC, as shown in FIG. 1, to a second point substantially adjacent the cylinders 18, 20 along the second balance shaft plane 68 when the pistons 28, 30 are at BDC, as shown in FIG. 2.

In the exemplary embodiment of the engine 10, the first and second balance shaft axes 54, 56 and the crankshaft axis 16 lie in a common transverse plane 72 that orthogonally intersects the central plane 26. In other embodiments of the invention, however, it may be desirable to not have the balance shaft axes 54, 56 and the crankshaft axis 16 all lying in a common transverse plane.

In the exemplary embodiment of the engine 10, the total mass of the counterweight 46 on the crankshaft 12 is sized for counterbalancing one half of a total unbalance load of the engine 10, and the counterweights 66, 70 on the first and second balance shafts 50, 52 are each sized for counterbalancing one quarter of the total unbalance load of the engine 10. It may be desirable in other embodiments of the invention to utilize fewer or more balance shafts than the two utilized in the exemplary embodiment of the engine 10.

The engine 10, of the exemplary embodiment, is a four-stroke engine, in which the pair of cylinders 18, 20 fire alternately on sequential rotations of the crankshaft 12, when the piston in the firing cylinder is approximately at TDC. This arrangement results in the engine 10 firing once for every 360 degrees of rotation of the crankshaft 12.

Having the engine fire every 360° provides an engine that runs considerably quieter than V-twin engines that fire at other intervals. For example, a V-twin engine having the cylinders spaced at 90°, with a single crank pin for both connecting rods is balanced, but fires at uneven alternate intervals of 270 and 450 crank degrees. Similarly, a V-twin engine having the cylinders spaced at 60°, with a single crank pin for both connecting rods is also balanced, but fires at uneven alternate intervals of 300 and 420 crank degrees. Firing at such uneven intervals generates noise and vibration that are undesirable in some environments, such as in automotive applications. The V-twin engine, of the invention, fires at even intervals of 360° to produce a more acceptable sound and vibration profile for an automotive environment.

Figure 4A:
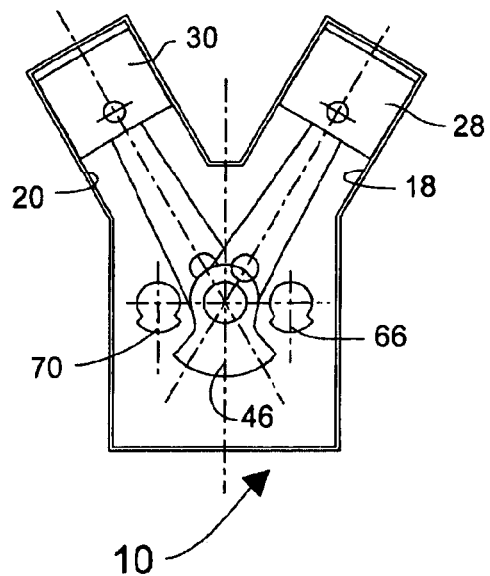
FIGS. 4a–4d are schematic cross section illustrations showing relative positions of internal components of the engine of FIGS. 1 and 2.
Figure 4B:
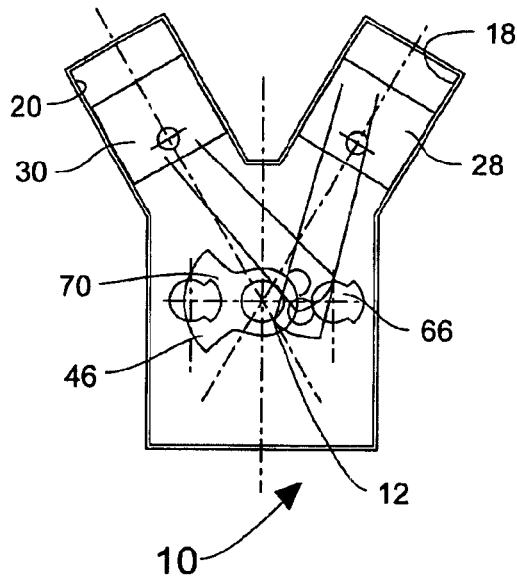
Figure 4C:
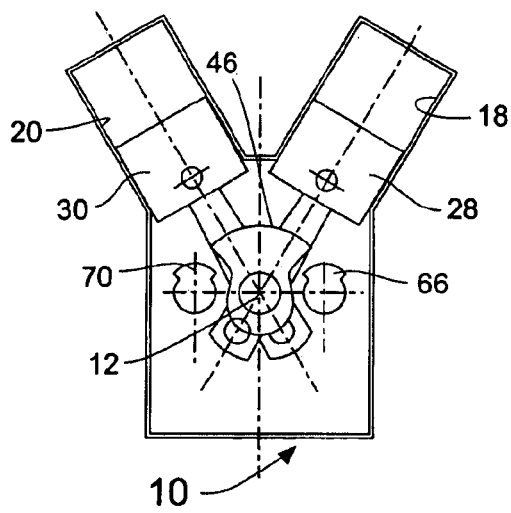

FIGS. 4a–4d sequentially show the motion of the internal components, described above, during a single rotation of the crankshaft 12 of the engine 10. FIG. 4a shows the engine 10 with the pistons 28, 30 at TDC, as shown and described in more detail above with respect to FIG. 1. FIG. 4c shows the engine 10 with the pistons 28, 30 at BDC, as shown and described in more detail above with respect to FIG. 2.

For purposes of explanation, it will be assumed that in FIG. 4a the left cylinder 20 (as shown in the FIGS.) is firing with the piston 30 at approximately TDC. It will be understood that the term approximately at TDC is intended to communicate that ignition in the cylinder 30 may be timed to occur at an appropriate point in a range of angular positions of the crankshaft 12, from several degrees before to several degrees after the piston 30 actually reaches TDC, as is known in the art.

With the left cylinder 30 firing, and beginning its power stroke, as shown in FIG. 4a, the right cylinder 28 has just completed its exhaust stroke, and is beginning its intake stroke. The crankshaft counterweight 46, and the first and second balance shaft counterweights 66, 70, are all oriented opposite the pistons 28, 30 to thereby counter vertical forces of the reciprocating components.

FIG. 4b shows the engine 10 components ¼ of the way through the crankshaft rotation, with the left piston 30 being forced downward on its power stroke, to thereby turn the crankshaft 12, and the right piston 28 drawing air into the right cylinder 18 on its intake stroke. Because the crankshaft 12 and the first and second balance shafts 50, 52 rotate in opposite directions, in a 1:1 rotation ratio, as described above, the first and second counterweights 66, 70 are positioned diametrically opposite the crankshaft counterweight 46, in the position shown in FIG. 4b, for counterbalancing internal unbalance forces in the engine 10.

FIG. 4c shows the engine 10 components ½ of the way through the crankshaft rotation, at BDC, with the left piston 30 having just completed its power stroke and beginning its exhaust stroke, and the right piston 28 having just completed its intake stroke and starting its compression stroke. At BDC, the crankshaft counterweight 46 and the first and second balance shaft counterweights 66, 70 are all aligned adjacent the pistons 28, 30 to counter vertical forces generated by the downward motion of the internal components during the first half of the engine rotation.

Figure 4D:
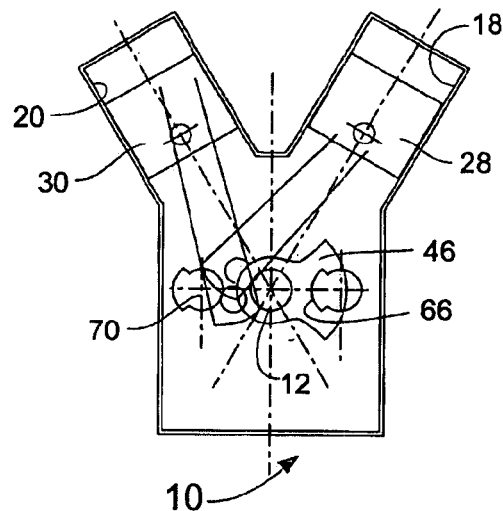

FIG. 4d shows the engine 10 components ¾ of the way through the crankshaft rotation, at BDC, with the left piston 30 halfway through its exhaust stroke, and the right piston 28 halfway through its compression stroke. Because the crankshaft 12 and the first and second balance shafts 50, 52 rotate in opposite directions, in a 1:1 rotation ratio, as described above, the first and second balance shaft counterweights 66, 70 are again positioned diametrically opposite the crankshaft counterweight 46, in the position shown in FIG. 4d, for counterbalancing internal unbalance forces in the engine 10.

When the crankshaft 12 has traveled another ¼ of a rotation, the pistons 28, 30 will once again be at TDC, as shown in FIG. 4a, with the left piston having just completed its exhaust stroke and beginning its intake stroke, and the right piston 28 having just completed its compression stroke. The right cylinder 18 will fire at approximately TDC, and the cycle described above will be repeated for the next rotation of crankshaft 12, with the right piston 28 completing its power and exhaust stroke, and the left piston 30 completing its intake and compression strokes during the second rotation of the crankshaft 12. This alternating cycle continues as long as the engine 10 is running, with the cylinders 18, 20 firing alternately on sequential rotations of the crankshaft 12.

Those skilled in the art will also readily recognize that, while the embodiments of the invention disclosed herein are presently considered to be preferred, various changes and modifications can be made without departing from the spirit and scope of the invention. For example, the invention can be used in V-twin reciprocating devices other than an engine, such as a compressor.

The scope of the invention is indicated in the appended claims, and all changes or modifications within the meaning and range of equivalents are intended to be embraced therein.

I claim:

1. A V-twin reciprocating apparatus having a crankshaft mounted in a crankcase for rotation about a crankshaft axis, the V-twin reciprocating apparatus comprising:
    a pair of cylinders, each defining a cylinder axis orthogonally disposed with respect to the crankshaft axis, the cylinders disposed in a V configuration with respect to one another, with the cylinder axes defining an included angle with respect to one another bisected by a central plane including the crankshaft axis;

a pair of pistons disposed, one in each cylinder, for reciprocating movement in the cylinders along the cylinder axes from a top dead center (TDC) position to a bottom dead center (BDC) position in the cylinders; and a pair of connecting rods, one in each cylinder, for operatively connecting the pistons to the crankshaft such that the pistons will reach TDC and BDC in their respective cylinders at substantially the same time;

the connecting rods joined at a crankshaft end thereof to the crankshaft by a pair of connecting rod journals centered at a common throw radius from the crankshaft axes and angularly displaced from one another along the throw radius by an angular displacement equal to the included angle of the cylinder axes;

wherein the crankshaft further includes a counterweight fixedly attached thereto at point substantially diametrically opposite the pistons for rotation with the crankshaft about the crankshaft, to thereby substantially center the counterweight along the central plane at a point opposite the pistons when the pistons are at TDC, and along the center plane at a point adjacent the pistons when the pistons are at BDC; and wherein the crankshaft has a first direction of rotation, and the V-twin reciprocating apparatus further includes a first balance shaft operatively connected to the crankshaft for rotation about a first balance shaft axis in a direction opposite the first direction.

2. The V-twin reciprocating apparatus of claim 1, wherein the first balance shaft rotates about the first balance shaft axis in a one-to-one (1:1) ratio of rotations of the first balance shaft with respect to rotations of the crankshaft.

3. The V-twin reciprocating apparatus of claim 2, wherein:

the first balance shaft axis is oriented in a direction parallel to the crankshaft axis and lying in a first balance shaft plane extending parallel to the central plane; and the first balance shaft further comprises a first balance shaft counterweight attached thereto for rotation with the first balance shaft about the first balance shaft axis from a first position at a point substantially opposite the cylinders along the first balance shaft plane when the pistons are at TDC, to a second point substantially adjacent the cylinders along the first balance shaft plane when the pistons are at BDC.

4. The V-twin reciprocating apparatus of claim 3, wherein the first balance shaft axis and the crankshaft axis lie in a common transverse plane orthogonally intersecting the central plane.

5. The V-twin reciprocating apparatus of claim 4 further comprising:

a second balance shaft operatively connected to the crankshaft for rotation about a second balance shaft axis in unison with the first balance shaft in a direction opposite the direction of rotation of the crankshaft in a one-to-one (1:1) ratio of rotations of the second balance shaft with respect to rotations of the crankshaft;

the second balance shaft axis is oriented in a direction parallel to the crankshaft axis in the common transverse plane and lying in a second balance shaft plane extending parallel to the central plane;

the second balance shaft further comprising a second balance shaft counterweight attached thereto for rotation with the second balance shaft about the second balance shaft axis, in unison with the counterweight of the first balance shaft, from a first position of at a point substantially opposite the cylinders along the second balance shaft plane when the pistons are at TDC, to a second point substantially adjacent the cylinders along the second balance shaft plane when the pistons are at BDC.

6. The V-twin reciprocating apparatus of claim 5, wherein the counterweight on the crankshaft is sized for counterbalancing one half of a total unbalance load of the reciprocating apparatus, and the counterweights on the first and second balance shafts are each sized for counterbalancing one quarter of the total unbalance load of the reciprocating apparatus.

7. A fourstroke V-twin in engine comprising:

a crankshaft mounted in an engine block for rotation about a crankshaft axis;

a pair of cylinders, each defining a cylinder axis orthogonally disposed with respect to the crankshaft axis, the cylinders disposed in a V configuration with respect to one another, with the cylinder axes defining an included angle with respect to one another bisected by a central plane including the crankshaft axis;

a pair of pistons disposed, one in each cylinder, for reciprocating movement in the cylinders along axes from a to dead center (TDC) position to a bottom dead center (BDC) position in the cylinders;

a pair of connecting rods, one in each cylinder, for operatively connecting the pistons to the crankshaft such that the pistons will reach TDC and BDC in their respective cylinders at substantially the same time;

the connecting rods joined at a crankshaft end thereof to the crankshaft by a pair of connecting rod journals centered at a common throw radius from the crankshaft axes and angularly displaced from one another along the throw radius by an annular displacement equal to the included angle of the cylinder axes; and one or more counterweights operatively connected to the crankshaft for counterbalancing an unbalance load of the engine such that a crankshaft counterweight is attached to the crankshaft for rotation therewith about the crankshaft axis; and a first balance shaft having a counterweight attached thereto, is mounted within the engine block for rotation about a first balance shaft axis, and operatively connected to the crankshaft to be rotated thereby about the first balance shaft axis.

8. The V-twin engine of claim 7 wherein the first balance shaft rotates in a direction opposite a direction of rotation of the crankshaft in a one-to-one (1:1) ratio of rotations of the second balance shaft with respect to rotations of the crankshaft.

9. The V-twin engine of claim 8, further comprising:

a second balance shaft operatively connected to the crankshaft for rotation about a second balance shaft axis in unison with the first balance shaft in a direction opposite the direction of rotation of the crankshaft in a one-to-one (1:1) ratio of rotations of the second balance shaft with respect to rotations of the crankshaft;

the second balance shaft further comprising a second balance shaft counterweight attached thereto for rotation with the second balance shaft about the second balance shaft axis, in unison with the counterweight of the first balance shaft.

10. The V-twin reciprocating engine of claim 9, wherein the unbalance load is a total unbalance load of the engine, the crankshaft counterweight is sized for counterbalancing one half of the total unbalance load of the engine, and the counterweights on the first and second balance shaft are each sized for counterbalancing one quarter of the total unbalance load of the engine.

11. A method for operating a V-twin engine, having a crankshaft mounted in an engine block for rotation about a crankshaft axis; a pair of cylinders, each defining a cylinder axis orthogonally disposed with respect to the crankshaft axis, the cylinders disposed in a V configuration with respect to one another, with the cylinder axes defining an included angle with respect to one another bisected by a central plane including the crankshaft axis, a pair of pistons disposed, one in each cylinder, for reciprocating movement in the cylinders along the cylinder axes from a top dead center (TDC) position to a bottom dead center (BDC) position in the cylinders, and a pair of connecting rods, one in each cylinder, wherein the engine defines a total unbalance load of the engine, the method comprising:

connecting the pistons to the crankshaft with the connecting rods, by joining the connecting rods at a crankshaft end thereof to the crankshaft by a pair of connecting rod journals centered at a common throw radius from the crankshaft axis and angularly displaced from one another along the throw radius by an angular displacement equal to the included angle of the cylinder axes, so that the pistons will each reach TDC in their respective cylinders at substantially the same time and BDC in their respective cylinders at substantially the same time;

attaching a crankshaft counterweight to the crankshaft for rotation therewith about the crankshaft axis; and providing a first balance shaft having a counterweight attached thereto, mounted within the engine block for rotation about a first balance shaft axis, and operatively connected to the crankshaft to be rotated thereby about the first balance shaft axis in a direction opposite a direction of rotation of the crankshaft in a one-to-one (1:1) ratio of rotations of the second balance shaft with respect to rotations of the crankshaft.

12. The method of claim 11, further comprising:

providing a second balance shaft operatively connected to the crankshaft for rotation about a second balance shaft axis in unison with the first balance shaft in a direction opposite the direction of rotation of the crankshaft in a one-to-one (1:1) ratio of rotations of the second balance shaft with respect to rotations of the crankshaft;

the second balance shaft further comprising a second balance shaft counterweight attached thereto for rotation with the second balance shaft about the second balance shaft axis, in unison with the counterweight of the first balance shaft.

13. The method of claim 12, wherein the engine defines a total unbalance load of the engine, and the method further comprises:

counterbalancing one half of the total unbalance load of the engine with the crankshaft counterweight;

counterbalancing one quarter of the total unbalance load of the engine with the counterweight on the first balance shaft; and counterbalancing one quarter of the total unbalance load of the engine with the counterweight on the second balance shaft.

* * * * *